UNITED STATES PATENT OFFICE.

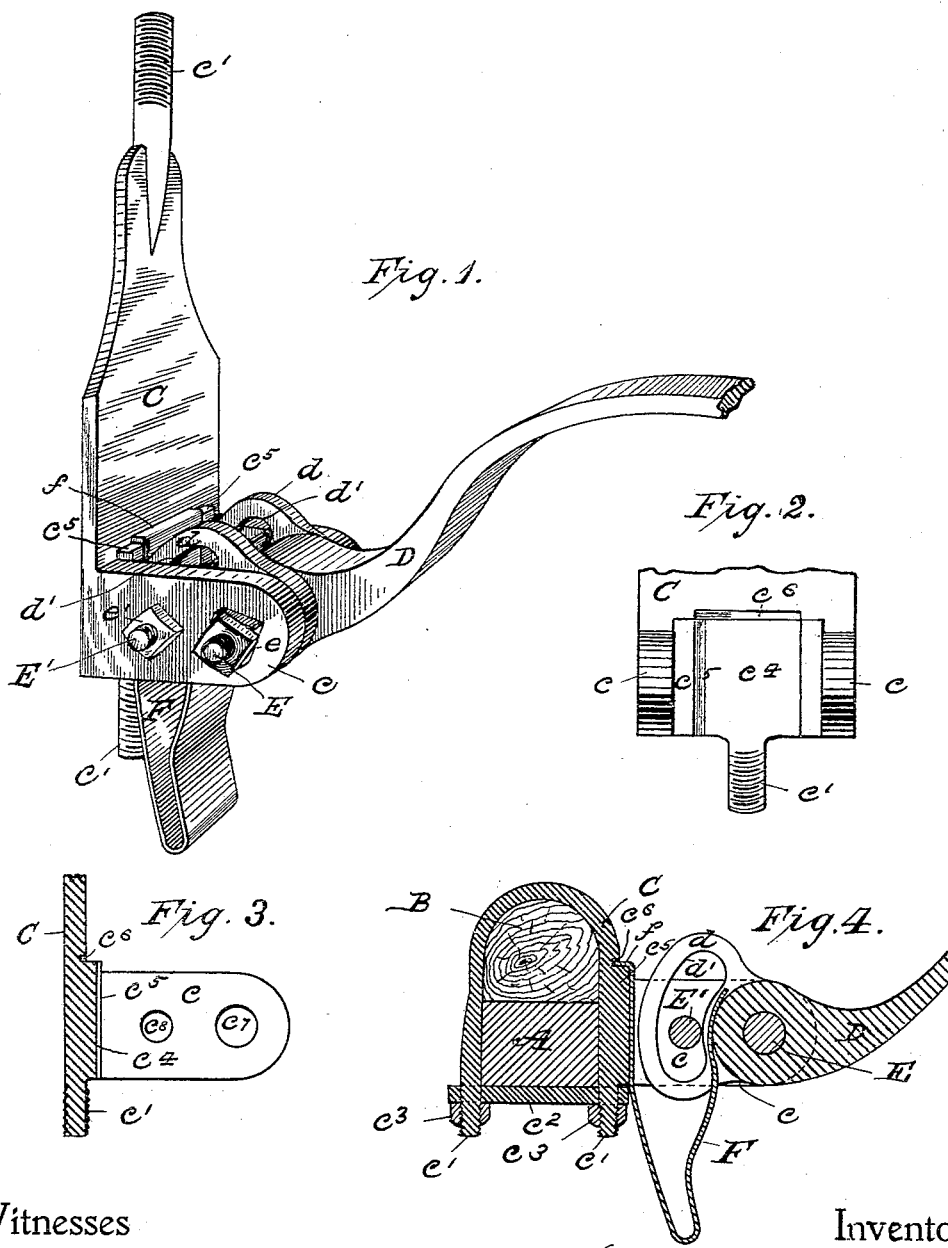

WILLIAM D. HOPKINS, OF GOFFSTOWN, AND HENRY W. HOPKINS, OF WILTON, NEW HAMPSHIRE.

THILL-COUPLING.

SPECIFICATION forming part of Letters Patent No. 623,214, dated April 18, 1899.

Application filed July 28, 1898. Serial No. 687,093. (No model.)

*To all whom it may concern:*

Be it known that we, WILLIAM D. HOPKINS, residing at Goffstown, and HENRY W. HOPKINS, residing at Wilton, in the county of Hillsborough and State of New Hampshire, have invented certain new and useful Improvements in Thill-Couplings; and we do hereby declare the following to be a full, clear, and exact description of the invention, such as will enable others skilled in the art to which it appertains to make and use the same.

The loss of thill-coupling bolts is of more frequent occurrence than many people suppose, and serious damage is often the result. The bolt may work out whole or it may become so worn that it will bend and break after its nut has worked off. There are various antirattling springs in present use which are also apt to become lost; and it is the object of this invention to avoid these difficulties in the construction of thill-couplings, as will be fully set forth in the following specification and claims, and clearly illustrated in the drawings accompanying and forming a part of the same, of which—

Figure 1 is a perspective view showing our improved thill-coupling complete. Fig. 2 is a detail view in broken elevation. Fig. 3 is a sectional elevation of a detail of our improved coupling, and Fig. 4 is a sectional elevation showing our improved coupling as when attached to the axle of a carriage.

Similar reference-letters denote corresponding parts in all the views.

A is the shaft-iron, B the bed-piece, and C is the thill-coupling strap having the ordinary ears $c$, to which may be secured the thills and the integral threaded studs $c'$, upon which a yoke-plate $c^2$ is secured by the nuts $c^3$.

The parts thus far described we are able to use in a form exactly similar to those in common use, but the parts to be subsequently described form, essentially, a novel construction and are important features of our invention.

D is a portion of a thill having curved flanges $d$, provided each with an elongated curved opening $d'$. The thills are secured within the ears $c$ by a bolt E and the auxiliary bolt E', each being provided with threaded nuts, respectively, $e\ e'$. The bolt E' passes through the curved elongated opening $d'$, the latter being considerably wider than the diameter of said bolt for a purpose to be hereinafter explained.

F is an antirattling spring which may be shaped substantially as seen in Fig. 4, one portion of which bears against the thill and the opposite side rests in a vertical groove $c^4$, formed for the purpose in the raised portion $c^5$ of the strap C and terminates in a right-angle projection $f$, extending over the top of the portion $c^5$ and within a groove $c^6$, which is shown best in Figs. 2, 3, and 4. This groove $c^6$ (shown best in Fig. 3) is designed to prevent the spring F from jumping out and becoming lost; but the fact that the auxiliary bolt E' passes between the sides of said spring would effectively prevent the same from becoming lost even though it might work out of place from the bent end $f$ becoming disengaged from the groove $c^6$.

In our improved construction the nuts $e$ may work off from the main bolt E and the latter be lost; but by reason of the auxiliary bolt E' passing through the curved openings $d'$ of the thill D the latter will still remain in position and be capable of performing its function, and as it is not desirable to have any unnecessary wear on the bolt E' sufficient space is left between said bolt and the back side of said opening $d'$ to allow for the natural wear of the main bolt E, so that normally the bolt E' is not in contact with the openings $d'$ of the flanges $d$.

The object of the groove $c^4$ in the strap C is to hold the spring F in its proper vertical position.

It is obvious that the raised portion $c^5$ may be dispensed with and the grooves $c^4\ c^6$ be made in the strap C and that by making the flange $d$ of the thill-iron D sufficiently thick one flange $d$ may take the place of two.

Having described our improvements, what we claim is—

1. A thill-coupling having in addition to the ordinary bolt an auxiliary bolt located between the ordinary bolt and the strap and passing through the ears of the said strap and through elongated curved perforations formed for the purpose in curved flanges projecting from the thill-coupling, and the said flanges and their elongated perforations, substantially for the purpose set forth.

2. A thill-coupling having in addition to the ordinary bolt an auxiliary bolt located between the ordinary bolt and the strap a vertical groove in said strap terminating at its top in a horizontal groove, a spring formed of folded steel one side of which bears upon the thill-iron and the other rising at the opposite side of said auxiliary bolt within said vertical groove and terminating in a bent portion adapted to rest within said horizontal groove, and one or more curved flanges projecting from the thill-iron and provided with a curved opening through which said auxiliary bolt loosely passes.

In testimony whereof we affix our signatures in presence of two witnesses.

WILLIAM D. HOPKINS.
HENRY W. HOPKINS.

Witnesses:
J. B. THURSTON,
WILLIAM H. DRURY.